United States Patent
Dakss

[11] 3,990,780
[45] Nov. 9, 1976

[54] OPTICAL SWITCH

[75] Inventor: Mark L. Dakss, Waltham, Mass.

[73] Assignee: GTE Laboratories Incorporated, Waltham, Mass.

[22] Filed: Aug. 22, 1975

[21] Appl. No.: 606,985

[52] U.S. Cl. .......................... 350/96 C; 350/96 WG
[51] Int. Cl.² ............................................. G02B 5/14
[58] Field of Search .................... 350/96 C, 96 WG

[56] References Cited
UNITED STATES PATENTS

| | | | |
|---|---|---|---|
| 3,871,743 | 3/1975 | Fulenwider | 350/96 WG |
| 3,904,270 | 9/1975 | Cheo | 350/96 C |
| 3,919,669 | 11/1975 | Hartemann | 350/96 WG |

*Primary Examiner*—John K. Corbin
*Assistant Examiner*—Stewart Levy
*Attorney, Agent, or Firm*—Irving M. Kriegsman; Leslie J. Hart; Robert A. Seldon

[57] ABSTRACT

An optical switch is described which has particular utility in communication systems utilizing light as a modulated carrier. The switch is susceptible to construction as an integrated optical device and may be formed with a planar substrate and an optically transparent film on a surface of that substrate which has an index of refraction higher than that of the substrate. This construction forms a planar optical waveguide. A plurality of parallel optical fiber waveguides are coupled into one side of the planar optical waveguide by conventional techniques and a like plurality of parallel output optical fiber waveguides are coupled out at an opposite side. An integrated beam deflection element is formed adjacent to each separate one of the pluralities of input and output optical fiber waveguides and is associated with the optical fiber waveguide. The beam deflection elements are each capable of deflecting light rays incident on the element through a plurality of discrete deflection angles. The specific deflection angles for an element are associated with the various separate ones of the other kind of the input or output optical waveguides. Finally, a means is included for selectively energizing a beam deflection element associated with an input optical fiber waveguide and a beam deflection element associated with an output optical fiber waveguide in a manner such that a beam of light entering the switch via the input optical fiber waveguide is transmitted through the selected output optical fiber waveguide in a totally optical manner.

7 Claims, 3 Drawing Figures

OPTICAL SWITCH

BACKGROUND OF THE INVENTION

The present invention is related to switching systems and is more particularly concerned with a novel totally optical switching system for communication purposes in which modulated beams of light are selectively switched between a plurality of inputs and a plurality of outputs.

The use of "light" frequency electromagnetic energy for communication purposes has recently been brought much closer to reality through the production of extremely low loss optical fibers and the extension of continous wave (CW) room temperature operation of diode lasers to over ten thousand hours. The new optical fibers exhibit only 2 db of loss per kilometer.

As a result of the foregoing developments, it is becoming increasingly apparent that the greatest loss in such a communication system occurs at those positions within the system where conversion between electrical and optical signals is required. At least with respect to known techniques for converting electrical signals to optical signals, definite limitations in conversion efficiencies are a fact of life. One particular portion of the system where such conversion efficiencies are extremely detrimental is in the switching networks. Presently, most such switching networks are exclusively electrical and require conversion from the optical signals to electrical signals before application to the network and subsequent reconversion to optical signals after the signal leaves the switching network.

Optical switching tree systems have been suggested. In such systems, an incoming light beam is deflected into one of two directions by a deflector. Each of the alternate beam positions are then passed to a second level of similar deflectors thereby producing four possible beams. N successive stages of such deflection produce $2^N$ beams. If M total beams are required to enter the systems, each of these must be treated separately by M such deflector trees before being accorded entry into appropriate outgoing optical fiber waveguides.

U.S. Pat. No. 3,871,743 to Fulenwider describes an optical crosspoint switching matrix for an optical communication system. This system is essentially an optical equivalent of an electrical crosspoint switching matrix. It utilizes a large number of separate acoustooptic beam steering mechanisms to switch light beams from a planar waveguide into an optical fiber waveguide and vice versa. Such a system includes a large number of fiber to waveguide coupling arrangements thereby greatly increasing the cost and complexity of the system.

SUMMARY OF THE INVENTION

Accordingly, it is an object of the present invention to provide a novel optical communication switching system in which a greatly decreased number of components is required.

A second object of the invention is to provide such a switching system which is totally susceptible to integrated optical circuit construction.

Another object of the invention is to provide such a switching system which is extremely flexible in its operation and which does not require conversion to an electrical signal in any point during the switching process.

Briefly, the invention, in its broadest aspect, is an optical switch having a planar optical waveguide having an index of refraction profile such that propagating light is confined within the planar optical waveguide. The planar optical waveguide has an input side and an output side. A plurality of parallel input optical fiber waveguides is coupled into the planar optical waveguide at the input side thereof. A like plurality of parallel output optical fiber waveguides is coupled out of the planar optical waveguide at the output side. A separate beam deflection element is formed on the planar optical waveguide adjacent to each separate one of each of the pluralities of input and output optical fiber waveguides. Each such beam deflection element is capable of deflecting a ray of light incident thereon through a like plurality of discrete deflection angles. Each such deflection angle for a selected beam deflection element is associated with a separate one of the other kind of input and output optical fiber waveguide. Means are provided for energizing a selected one of the beam deflection elements adjacent to an input optical fiber waveguide and a selected one of the beam deflection elements adjacent to an output optical fiber waveguide so that a beam of light from that selected input optical fiber waveguide may be coupled into the selected output optical fiber waveguide.

Further objects, advantages and features of the invention will be apparent in the arrangement and construction of the constituent parts, in detail, as set forth in the following specification taken together with the accompanying drawing.

DETAILED DESCRIPTION OF THE PREFERRED EMBODIMENTS

Figure 1:
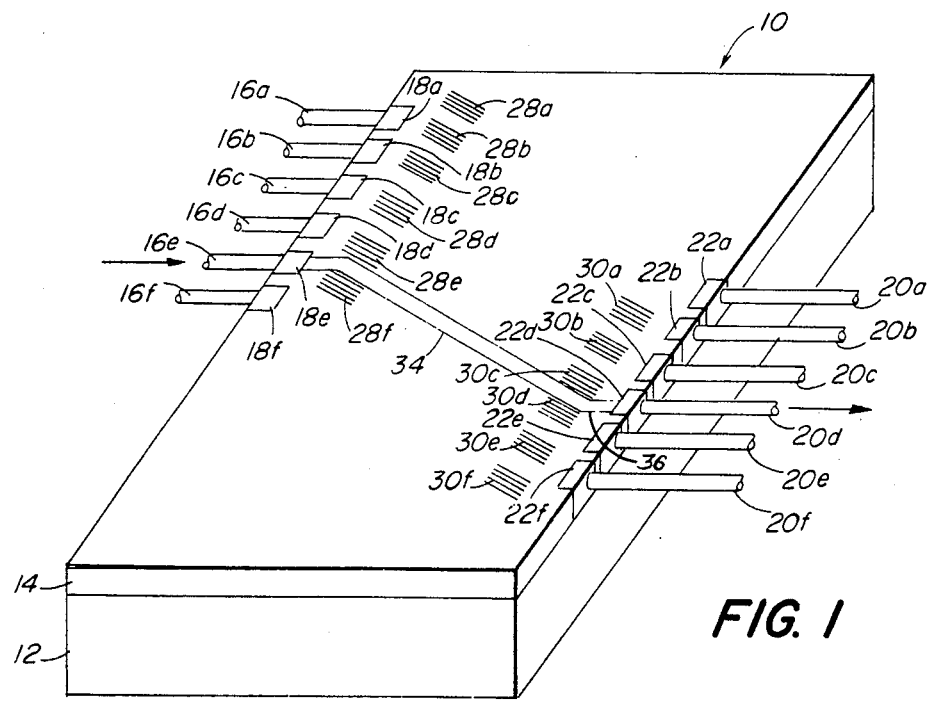
FIG. 1 is a greatly enlarged, partially schematic view of an integrated optical circuit according to the present invention in which light may be switched selectively between a plurality of inputs and a plurality of outputs.

In referring to the various figures of the drawing hereinbelow, like reference numerals will be utilized to refer to identical parts of the apparatus.

Referring now to FIG. 1, there is shown a preferred embodiment of an optical switch according to the present invention which is identified generally by the reference numeral 10. The switch includes a substrate 12 on which a thin film of an optically transparent material 14 is disposed. The index of refraction of the film 14 is greater that of the substrate 12 thereby producing a planar optical waveguide across the surface of the switch 10. The switch 10 is formed such that the planar optical waveguide has an input side and an output side at the respective edges of the substrate 12. In the preferred embodiments, these input and output edges are parallel to each other; however the purview of the invention includes devices in which the input and output sides are not parallel to each other.

Although the substrate and film form of planar optical waveguide is particularly shown and described, any other type of planar optical waveguide construction is within the purview of the invention. Generally, a planar optical waveguide having an index of refraction profile such that propagating light is confined within the planar optical waveguide is required. So-called graded index planar optical waveguides are such devices as are included in the purview of the invention.

A plurality of parallel input optical fiber waveguides 16 are coupled into the planar optical waveguide by a like plurality of fiber-to-film couplers 18. The couplers 18 may be of any known configuration such as the edge configuration shown in the drawing or holographic input couplers such as are shown in U.S. Pat. No. 3,864,016. Similarly, a plurality of output optical fiber waveguides 20 are coupled out of the planar optical waveguide through a series of fiber-to-film coupling devices 22.

A pair of columns of separate beam deflection elements 28 and 30 are associated with the input and output optical fiber waveguides 16 and 20 respectively so that an individual beam deflection element is associated with each separate one of the pluralities of input and output optical fiber waveguides. Finally, each of the pluralities of beam deflection elements 28 and 30 is connected to a signal source, which is not shown in FIG. 1 for sake of clarity, which provides signals to the respective beam deflection elements in order to switch signals arriving on the input optical fiber waveguides 16 to appropriate ones of the output optical fiber waveguides 20.

Figure 2:
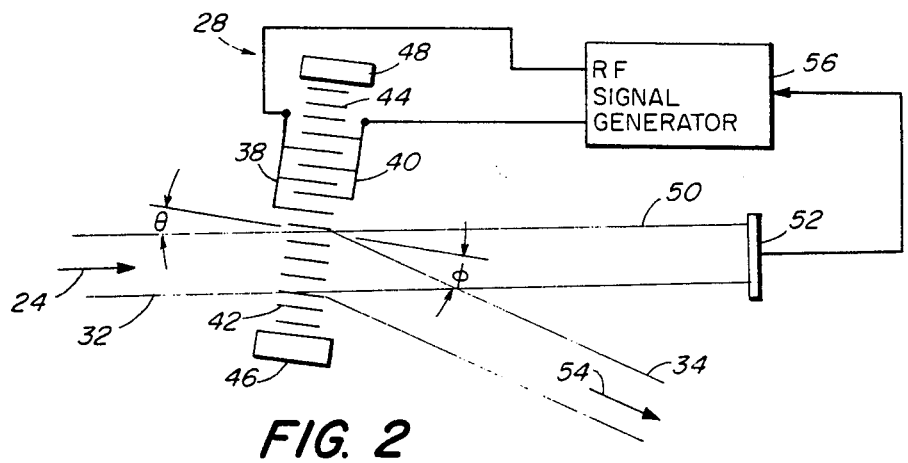
FIG. 2 is a further enlarged schematic diagram of a single beam deflection element of the type shown in FIG. 1 which is useful for explaining the operation of the present invention.

Referring now to FIG. 2 of the drawing, a greatly enlarged view of a single one of the beam deflection elements 28 is shown and is useful for explaining the operation of the present invention. An input beam of light 32 from one of the input optical fiber waveguides 16 is incident on the beam deflection element 28 at approximately the Bragg angle $\phi$. The incidence of the incoming beam of light is denoted by the arrow 24. The beam deflection element 28 must be capable of deflecting a ray of light incident on it through a plurality of discrete deflection angles which is equal to the number of input and output optical fiber waveguides utilized in the particular apparatus. In the arrangement shown in FIG. 1, six such beam deflection angles are necessary for each deflector. The beam deflection angle is shown in FIG. 2 as $\phi$. In this manner, a switched beam 34 is generated which is directed to a selected one of the output beam deflection elements 30. The outgoing direction of the beam of light 34 is denoted by the arrow 54.

In the preferred arrangement of the invention, the beam deflection element 28 is an acoustooptic deflector. The acoustooptic deflector is comprised of a pair of interdigital electrodes 38 and 40 which are connected to an rf signal generator 56. An rf voltage of a selected frequency is applied across the electrodes 38 and 40 thereby generating acoustic surface waves 42 and 44 going in opposite directions across the planar optical waveguide. The direction of the acoustic surface waves is dictated by the position of the interdigital electrodes 38 and 40. The acoustic surfaces waves 42 and 44 are finally absorbed in absorbing elements 46 and 48 respectively. However, the absorbing element 46 is disposed at a sufficient distance from the electrodes 38 and 40 so that the incoming beam of light 32 may pass therebetween so as to only be incident on the acoustic wave 42.

Initially, when the beam of light 32 enters the optical switch 10, the beam deflection element 28 is not switched on by the rf signal generator 56. Therefore, the beam 32 passes through the beam deflection element 28 and strikes an absorbing and detecting element 52. The first bits of information detected constitute an address which is transmitted to the rf signal generator 56. The signal generator 56 then applies a selected rf frequency signal across the electrodes 38 and 40. The rf frequency selected determines the frequency and wavelength of the acoustic surface wave 42. The acoustic surface wave 42 causes a periodic alternation in the refractive index of the planar optical waveguide 14. This periodic alteration in refractive index acts as a Bragg deflector and deflects the beam of light 32 through an angle $\phi$ which is determined by the acoustic wavelength. In this manner, the direction of the beam of light 34 in the planar optical waveguide is selected.

Referring again to FIG. 1, in those embodiments wherein the rows of input and output couplers on the planar optical waveguide 14 are parallel, if an identical rf signal is applied to both the input beam deflecting element 28 and the output beam deflecting element 30 at which the desired optical fiber output waveguide 20 is terminated, the beam 34 is deflected through an identical angle by the beam deflection element 30 to form an optical guided wave 36 which may be coupled by the element 22 into the output optical fiber waveguide 20. Of course, if the input and output edges of the planar optical waveguide 14 are not parallel, then the signals applied to the deflection elements 28 and 30 are necessarily different since the respective deflection angles through which the beams are deflected are different at each of the respective deflection elements.

Although the acoustooptic interdigital type of transducer is shown in FIGS. 1 and 2 and is a preferred embodiment, any other type of deflection element which is capable of deflecting a beam of light through a selected series of discrete angles in response to discrete stimuli is also included within the purview of the invention. For example, Gunn-effect excited acoustooptic deflectors may be utilized and have the advantage that DC rather than rf voltages are utilizable. Also, electrooptic and magnetooptic systems may be utilized.

Figure 3:
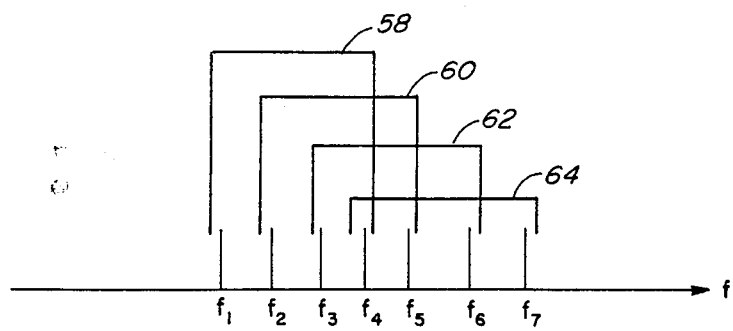
FIG. 3 is a graphical representation of the range of frequency selective capability which is required for the beam deflection element described above.

Only a discrete number of deflection angles is required for each of the deflection elements 28 and 30. If M is taken to be the number of incoming optical fiber waveguides and a like number optical fiber output waveguides 20 are utilized, then 2M−1 frequencies are required in order to accomplish these switching functions. When the input and output sides of the planar optical waveguide 14 are parallel, the same 2M−1 frequencies apply to the deflection elements 28 and 30. FIG. 3 illustrates this feature of the invention for the case where M equals 4. The brackets 58, 60, 62 and 64 in FIG. 3 show the ranges of frequencies through which the various deflection elements must operate. The deflection angles may be selected so as to not vary greatly from Bragg angle which results in high throughput efficiencies being accomplished in the optical switch 10.

While there has been shown to be described what is considered to be a preferred embodiment of the present invention, it will be obvious to those skilled in the art that various changes and modifications may be made therein without departing from the spirit of the invention as defined in the appended claims.

I claim:
1. An optical switch comprising:
a planar optical waveguide having an index of refraction profile such that propagating light is confined within the planar optical waveguide, the planar optical waveguide having an input side and an output side;
a plurality of parallel input optical fiber waveguides being coupled into the planar optical waveguide at the input side thereof, each fiber waveguide being adapted to guide a different optical signal;
a like plurality of parallel output optical fiber waveguides being coupled out of the planar optical waveguide at the output side thereof;
a separate beam deflection element being formed on the planar optical waveguide adjacent to each separate one of each of the pluralities of input and output optical fiber waveguides, each beam deflection element being capable of deflecting a ray of light incident thereon through a like plurality of deflection angles, each such deflection angle for a selected beam deflection element being associated with a separate one of the other kind of input and output optical fiber waveguides; and
means for energizing selected pairs of the beam deflection elements, the pair members being respectively adjacent to an input and an output optical fiber waveguide so that selected input optical signals may be independently and simultaneously routed into respectively selected output optical fiber waveguides.

2. An optical switch according to claim 1, wherein the input and output sides of the planar optical waveguide are parallel and opposing.

3. An optical switch according to claim 2, wherein there is further included means for coupling the input and output optical fiber waveguides to the planar optical waveguide.

4. An optical switch according to claim 3, wherein each beam deflection element is an acoustic surface wave beam deflector.

5. An optical switch according to claim 4, wherein each acoustic surface wave beam deflector is aligned to its respective waveguide at essentially the Bragg angle for a selected acoustic surface wave frequency.

6. An optical switch according to claim 5, wherein the means for energizing is a variable frequency rf generator which is coupled to each individual acoustic surface wave beam deflector and supplied appropriate rf signals to selected combinations of input and output optical fiber waveguides to cause optical coupling therebetween to be accomplished.

7. An optical switch according to claim 6, wherein the input and output sides of the planar optical waveguide are essentially parallel thereby causing the rf signals applied to the selected combinations of individual acoustic surface wave beam deflectors to be identical.

* * * * *